Figure 1:
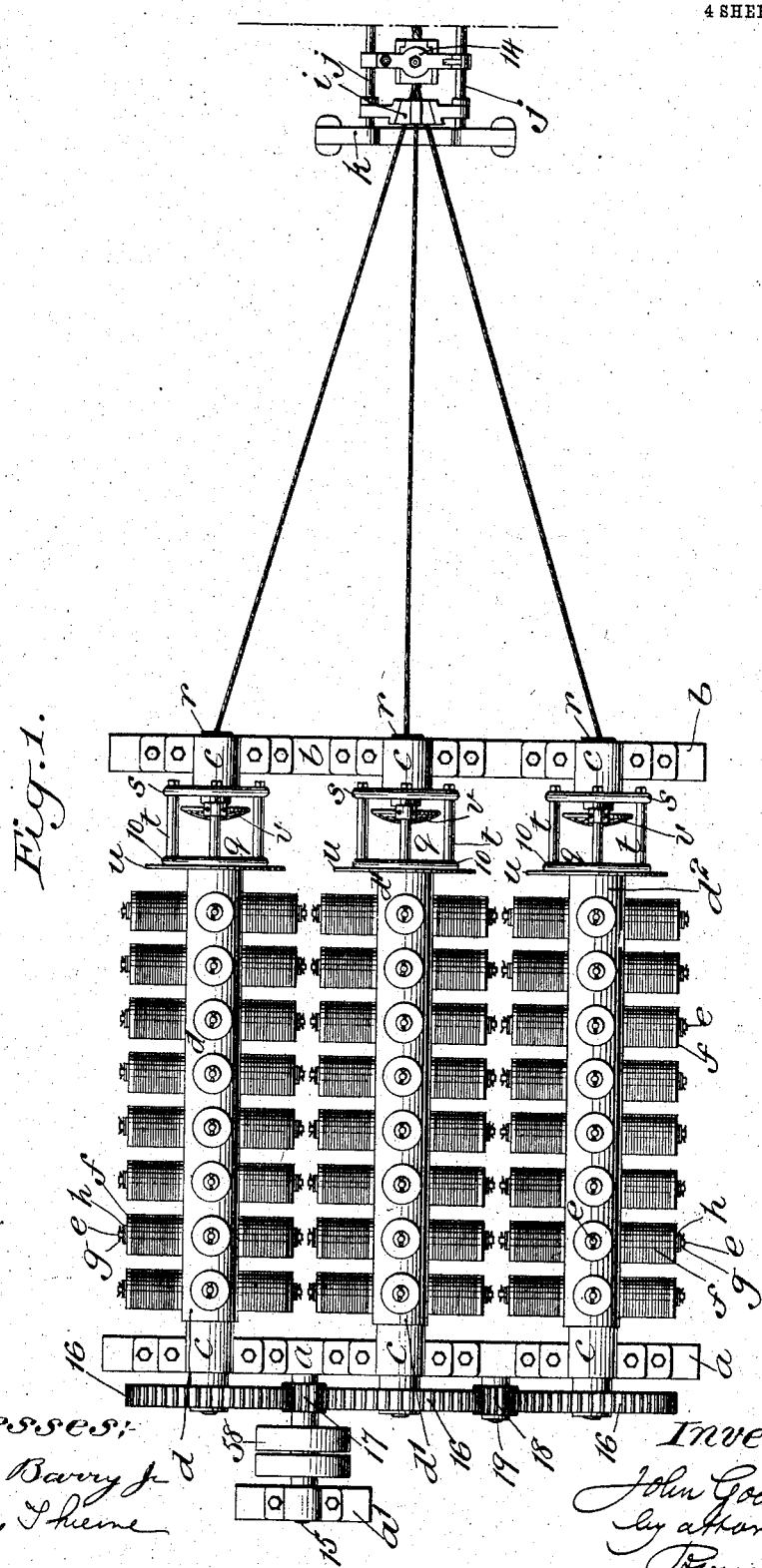

No. 781,281. PATENTED JAN. 31, 1905.
J. GOOD.
ROPE MACHINE.
APPLICATION FILED APR. 19, 1902. RENEWED AUG. 30, 1904.

4 SHEETS—SHEET 1.

Witnesses:
George Barry Jr
Henry Thieme

Inventor
John Good
by attorneys
Brown & Seward

No. 781,281. PATENTED JAN. 31, 1905.
J. GOOD.
ROPE MACHINE.
APPLICATION FILED APR. 19, 1902. RENEWED AUG. 30, 1904.
4 SHEETS—SHEET 2.
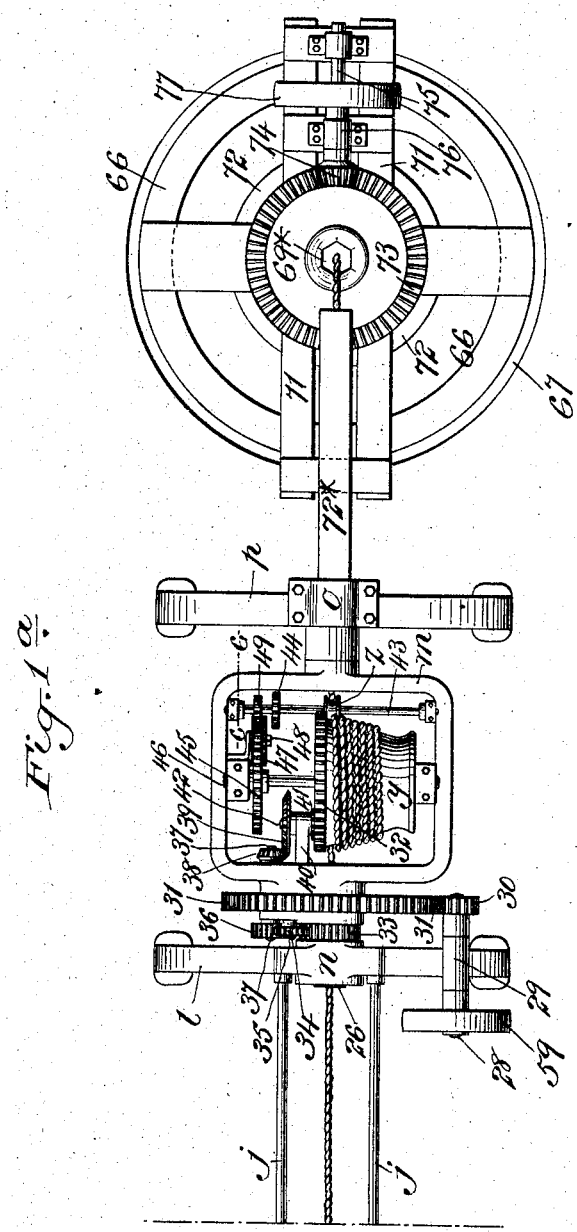
Witnesses:-
George Barry Jr.
Henry Thieme
Inventor:-
John Good
by attorneys
Brown & Seward

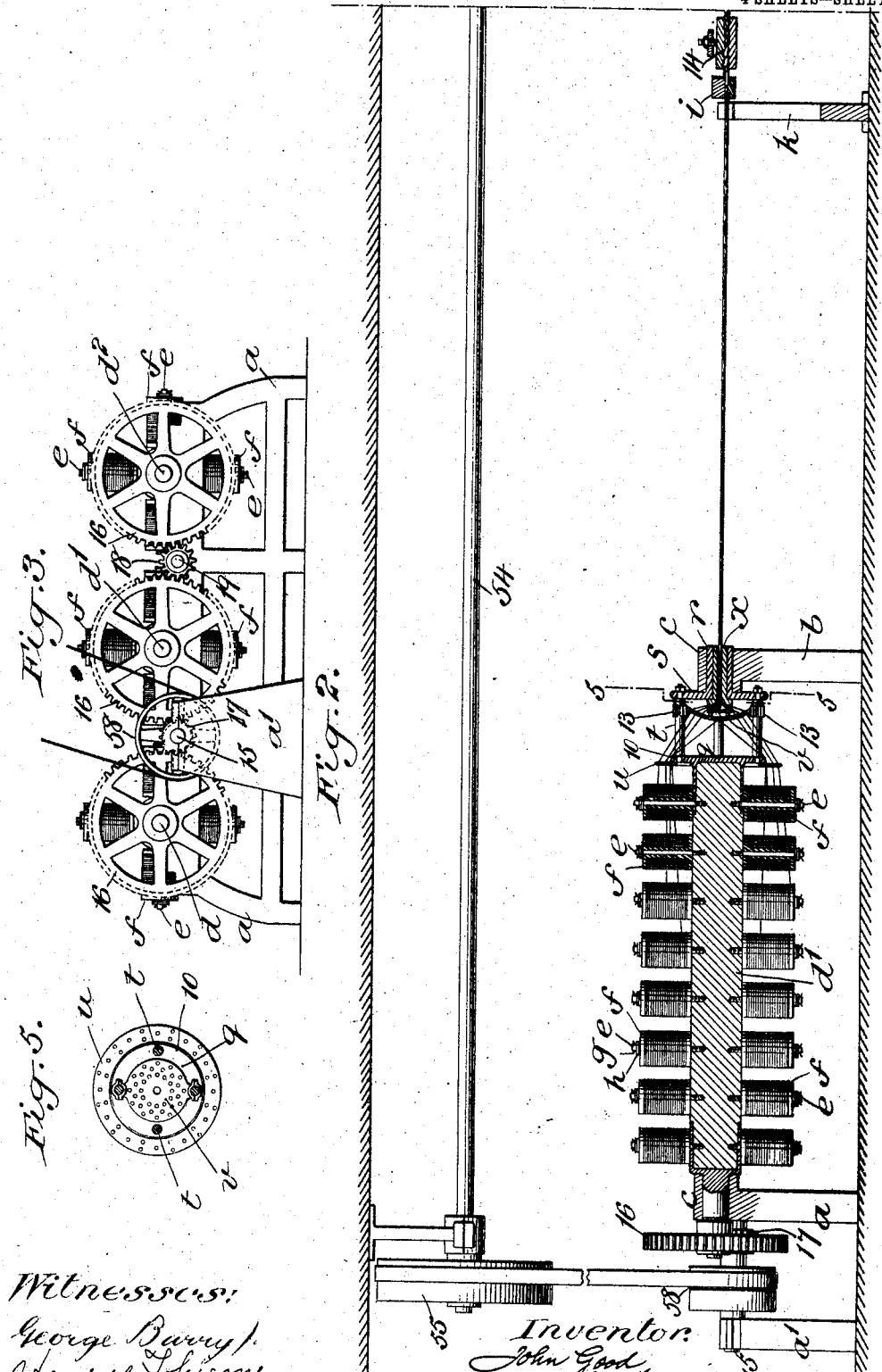

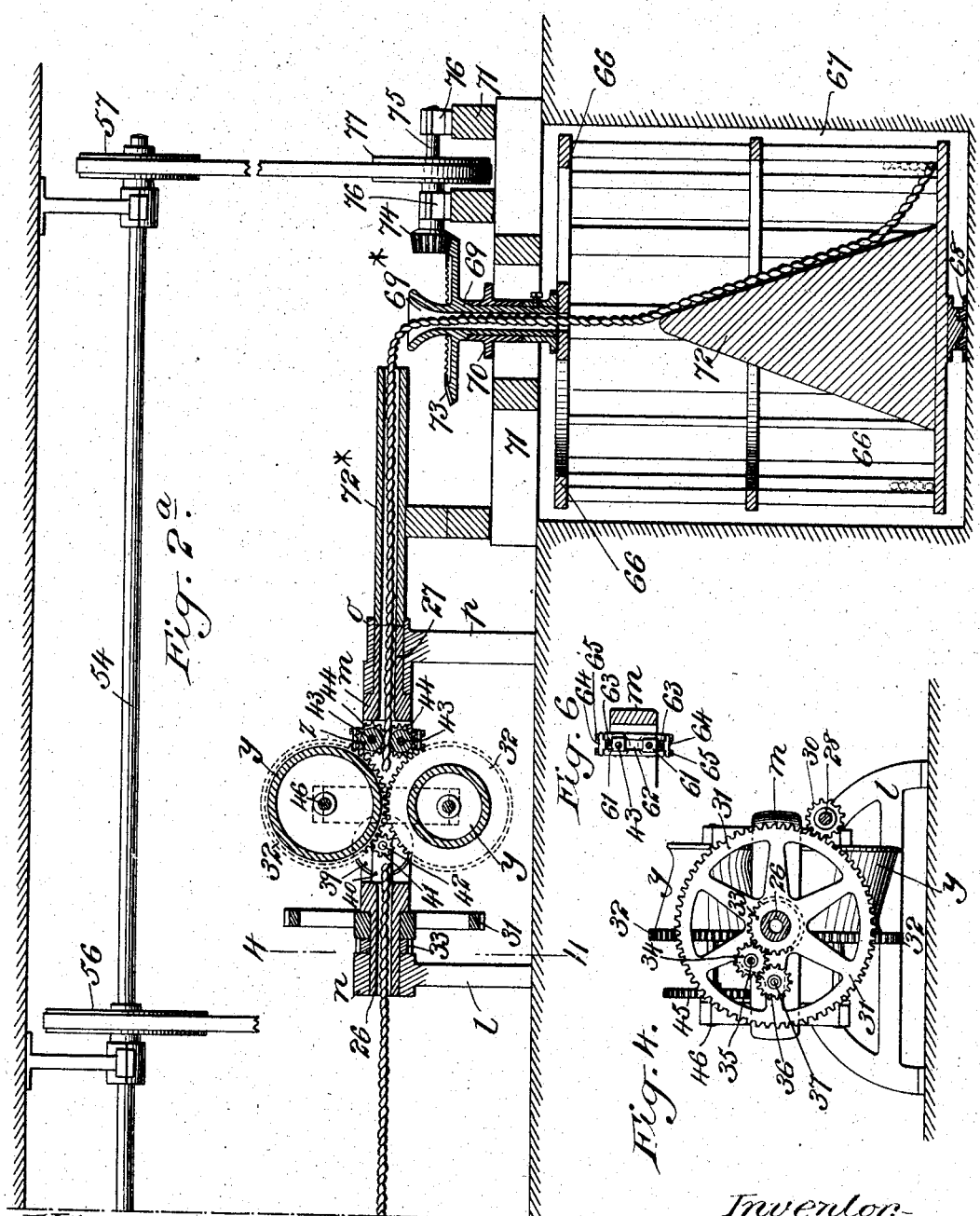

No. 781,281.

Patented January 31, 1905.

UNITED STATES PATENT OFFICE.

JOHN GOOD, OF NEW YORK, N. Y., ASSIGNOR, BY DIRECT AND MESNE ASSIGNMENTS, TO THE JOHN GOOD CORDAGE CO., A CORPORATION OF NEW YORK.

ROPE-MACHINE.

SPECIFICATION forming part of Letters Patent No. 781,281, dated January 31, 1905.

Application filed April 19, 1902. Renewed August 30, 1904. Serial No. 222,759.

*To all whom it may concern:*

Be it known that I, JOHN GOOD, a citizen of the United States, and a resident of the borough of Brooklyn, in the city and State of New York, (whose post-office address is No. 71 New York avenue, Brooklyn, New York,) have invented a new and useful Improvement in Rope-Machines, of which the following is a specification.
This invention relates to rope-machines which perform by a continuous process the operations of twisting yarns together to produce a number of strands and the laying of the so-produced strands together to form a rope; and my improvement consists in the means hereinafter described and claimed whereby the said operations are performed and whereby the rope is deposited in the form of a coil.
In the accompanying drawings, forming part of this specification, Figures 1 and $1^a$ represent a plan of a rope-machine embodying my invention; Figs. 2 and $2^a$, a central longitudinal vertical section of the same; Fig. 3, a rear end view of the same; Fig. 4, a transverse vertical section in the line 4 4 of Fig. $2^a$; Fig. 5, a transverse section in the line 5 5 of Fig. 2; Fig. 6, a section of part of the laying-flier in the line 6 6 of Fig. $1^a$.
$a\ b$ designate standards which contain stationary bearings $c\ c$ for the journals of what I call the "strand-forming spindles" $d\ d'\ d^2$, by the rotation of which numerous spun yarns are formed into strands. These spindles, of which there are three represented, are shown in Fig. 1 as arranged side by side parallel with each other. The said strand-forming spindles $d\ d'\ d^2$, the bodies of which may be of wood, have radially secured to them, as shown in Fig. 3, the spindles $e$, on which are loosely arranged the yarn-bobbins $f$. Of these bobbins there may be any suitable number, according to the size of the yarns and of the strands to be produced therefrom. The spindles $e$ and their bobbins $f$ are arranged upon the spindles $d\ d'\ d^2$ in several rows, of which there may be any suitable number in each row. For example, in the machine represented there are four rows and eight in each row.

The spindles $e$ are represented as screwed into their respective spindles $d\ d'\ d^2$, and the bobbins are represented as retained on their spindles $e$ by pins $g$, inserted through the spindles, and washers $h$ on the spindles between said pins and the outer heads of the bobbins.
At some distance forward of the spindles $d$ $d'\ d^2$ there is arranged a stationary conductor $i$, represented as what is known as a "laying-top," such as is common in rope-machines, which is carried by rods $j$, which are supported in standards $k$ and $l$, the latter of which contains the bearing $n$ for one of the journals of the laying-flier $m$, by the rotation of which the strands produced from the yarns by the rotation of the strand-spindles are laid into rope. The bearing $o$ for the other journal of the laying-flier is on a standard $p$. The rods $j$ also support a nipper 14, which is or may be like nippers commonly employed in rope-machines, its two jaws together having their interior the female counterpart of the exterior of the laid rope.

On the head or front end of each strand-spindle is provided or firmly secured, as shown in Figs. 1 and 2, a flange-piece $q$, between which and the front spindle-journal $r$ there is an open space, the said journal, which is hollow, being provided with a flange $s$, which is rigidly connected by parallel rods $t$ with the flange 10 of $q$. At the back of the flange 10 there is firmly secured to the flange-piece $q$ an annular plate $u$, of which a face view is shown in Fig. 5, and in which are several concentric circular series of holes for the separate passage through said plate of the yarns from the bobbins $f$. Between the flange-piece $q$ and the flange $s$ of the journal $r$ there is carried by the rods $t$ a circular plate $v$, in which are several annular series of holes like those in the circular plate $u$ and a larger central hole. The hollow journal $r$ is fitted with a tight bushing $x$, (see Fig. 2,) the bore of which is of such caliber that the formed strand may pass through it with some friction. The plate $v$ is secured to two of the rods $t$ by screw-clamps 13, provided on said plate, the said clamps permitting the adjustment of the said plate nearer to or farther from the inner end of the bushing $x$. In the gathering together of all the yarns from the bobbins $f$ of one strand-forming spindle to form a strand all of said yarns pass through the holes in the plate $u$, those for the central portion of the said strand passing through the innermost circular series of such holes and thence to and through the central opening in the plate $v$, those for the body and exterior of the strand passing through the intermediate and outer series of such holes and thence through corresponding holes in the plate $v$, whence they are collected at the entrance to the journal-bushing $x$, through which they pass together.

The three spindles $d\ d'\ d^2$ have rotary motion given to them in the same direction, as shown in Figs. 1 and 3, by a driving-shaft 15, which runs in bearings in the standard $a$ and in a standard $a'$, arranged in rear of $a$. The said spindles are furnished, respectively, with three similar spur-gears 16. A pinion 17 on the said shaft 15 gears with and drives the gears 16 on the two spindles $d\ d'$, and a pinion 18, turning on a fixed stud 19 on the standard $a$, gears with the gears 16 on the two spindles $d'\ d^2$. By this gearing the said shaft 15 drives the three spindles $d\ d'\ d^2$ in the same direction and at the same velocity.

The laying-flier $m$ is represented in Figs. $1^a$, $2^a$, and 4. This flier contains a pair of capstans $y$, by which the rope laid by the rotation of the flier is drawn into it through its hollow rear journal 26, and it contains also a pair of delivery-rollers $z$, by which the rope received from the capstans is delivered through its hollow front journal 27 to be coiled, as hereinafter described, inside of a rotary barrel or cage 66. The said flier $m$ may have rotary motion given to it by any suitable means. I have represented for this purpose (see Fig. $1^a$) a short driving-shaft 28, running in bearings in a bracket 29 on the standard $l$. This shaft 28 carries a pinion 30, which gears with a spur-gear 31, fast on the flier. The two capstans, which run in bearings in the sides of the flier, are geared together by two spur-gears 32. They are represented as deriving their necessary rotary motion within the flier through the rotation of the flier itself from a stationary spur-gear 33, (see Figs. $1^a$, $2^a$, and 4,) which surrounds the journal 26 and is secured in or onto the bearing $n$. This gear is geared through a planet-gear 34, running loosely on a stud 35, carried by the flier, with a gear 36 on the outer end of a short shaft 37, which is arranged in a bearing in the end of the flier eccentrically thereto, but parallel with the axis thereof. On the inner end of this shaft 37 is a bevel-gear 38, gearing with a bevel-gear 39 on a short shaft 42, arranged transversely to the flier-axis in a bracket-bearing 40 therein. This shaft 42 carries a pinion 41, (see Fig. $2^a$,) which gears with one of the capstan-gears 32. The pair of delivery-rollers $z$ are carried by transverse shafts 43, which are arranged in bearings in the sides of the flier, and they are geared together by gears 44. The said delivery-rollers are driven by a gear 45 on the shaft 46 of one of the capstans through an intermediate gear 47, which turns freely on a stud 48, carried on one side of the flier and which gears with a gear 49 on one of the roller-shafts 43. The journal-boxes 61 of the shafts 43 are fitted, as shown in Fig. 6, to slide in ways 62, provided in the sides of the flier, and springs 63 are applied within these ways between the said boxes and caps 64, which are fitted to the ends of the ways and secured thereto by screws 65, which are adjusted to produce more or less compression of the springs that the latter may produce a sufficient bite of the said rollers $z$ on the rope to make them keep the rope taut on the capstans and to take it therefrom and deliver it through the hollow journal 27 of the flier.

For the purpose of receiving and coiling the rope as it is delivered from the flier $m$ by the rollers $z$ I have shown a receptacle consisting of an upright rotary skeleton barrel or cage 66, which is arranged in a pit 67 below and at a short distance in front of the flier $m$, the said barrel or cage having a lower journal running in a step 68 at the bottom of the pit and an upper journal 69, which is hollow, running in a bearing 70, carried by cross-beams 71, arranged across the mouth of the pit 67. The hollow journal 69 has a funnel mouth, as shown at $69^*$ in Fig. $2^a$. The bottom of the receptacle 66 is formed with or has upon it a cone 72, which projects upward to within some distance from the hollow upper journal 69 and is concentric with the latter. Between the hollow front journal 27 of the flier $m$ and the hollow upper journal 69 of the rotary receptacle 66 there is a stationary conductor consisting of a tube $72^*$. For the purpose of giving rotary motion to said receptacle 66 there is provided on the upper hollow journal a bevel-gear 73, which gears with a bevel-pinion 74 on a horizontal driving-shaft 75, which runs in bearings in standards 76, erected on the cross-beams 71. By this rotary motion the rope delivered from the flier $m$ by the delivery-rollers $z$ and passing through the conductor $72^*$ and through the hollow journal 69 into the barrel or receptacle 66 and striking the cone 72 is by said cone deflected outward from the axis of said receptacle and being then subjected by the rotation of said receptacle to the action of centrifugal force is caused to coil itself into a hollow coil which, beginning to form at the bottom of said receptacle, builds itself up first against the sides of said receptacle and afterward coil within coil. When a sufficient quantity of rope has been thus coiled in the receptacle, the machine is stopped, and the rope is cut off between the conductor $72^*$ and the journal 69. The rope may then be removed from the receptacle by withdrawing it through the hollow journal 69 by any suitable means.

The driving-shaft 15 for the strand-twisting spindles $d$ $d'$ $d^2$, the driving-shaft 28 for the flier $m$, and the driving-shaft 75 for the barrel 66 are represented as all deriving their motion from a line-shaft 54, (see Figs. 2 and $2^a$,) which carries three pulleys 55, 56, and 57, the pulley 55 being belted to a pulley 58 on the shaft 15, the pulley 56 being belted to a pulley 59 on the shaft 28, and the pulley 57 being belted to a pulley 77 on the shaft 75. It will be understood that the direction of the rotation of the strand-twisting spindles $d$ $d'$ $d^2$ and that of the flier should be such that the lay of the rope is in the opposite direction to the twist of the strands.

In the operation of the machine the twist of the strands takes place between the heads of the spindles $d$ $d'$ $d^2$ and the nipper 14, and the lay of the rope is produced between the said nipper and the flier, and the delivered rope is coiled loosely within the receptacle 66, whence it may be taken by any suitable means.

What I claim as my invention is—

1. In a rope-machine, the combination of a plurality of rotary strand-twisting spindles and stationary bearings therefor, a rotary laying-flier having hollow journals, a stationary conductor arranged between said twisting-spindles and laying-flier for conducting to said flier the strands collected from said spindles, a capstan within said flier for drawing the collected strands thereinto through one of its hollow journals, and a pair of spring-pressed delivery-rollers within said flier for delivering the laid rope from said capstan through the other of said hollow journals, substantially as herein described.

2. In a rope-machine, the combination of a plurality of rotary strand-twisting spindles and stationary bearings therefor, a rotary laying-flier having hollow journals, a laying-top between said strand-twisting spindles and flier, a nipper between the laying top and flier, a capstan within the flier for drawing thereinto through one of its hollow journals the collected and laid strands from said laying-top and nipper, and spring-pressed delivery-rollers within said flier for delivering the laid rope through the other of said hollow journals, substantially as herein described.

3. In a rope-machine, a rotary upright receptacle for the finished rope having a hollow upper journal and a cone projecting upward from its bottom concentric with said journal, substantially as herein described.

4. In a rope-machine, the combination with a laying-flier having a hollow journal through which the laid rope is delivered, of an upright rotary receptacle having a hollow upper journal through which the laid rope received through the hollow journal of the flier is fed into said receptacle and having a cone projecting upward from its bottom concentric with said journal, substantially as herein described.

In testimony that I claim the foregoing as my invention I have signed my name, in presence of two witnesses, this 18th day of April, 1902.

JOHN GOOD.

Witnesses:
 FREDK. HAYNES,
 GEORGE BARRY, Jr.